Figure 1:
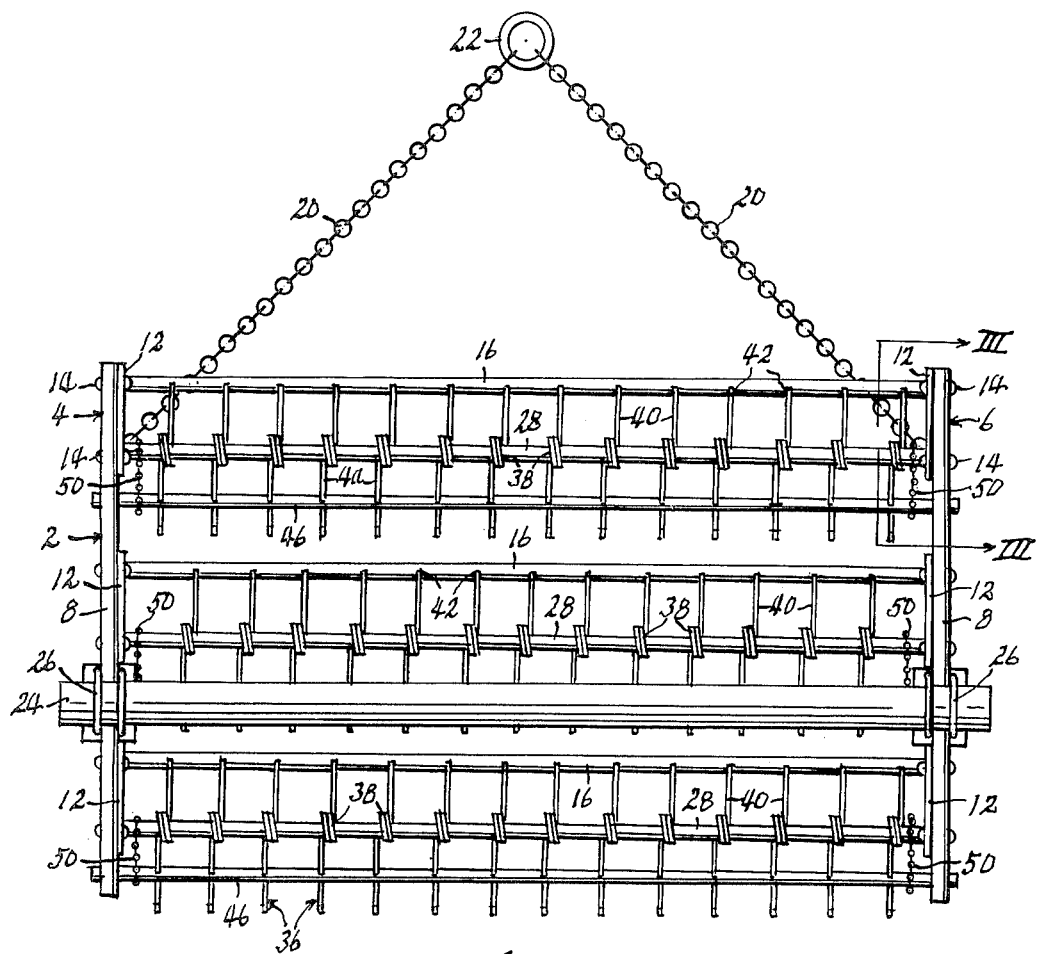

United States Patent [19]
Duckworth

[11] 4,256,185
[45] Mar. 17, 1981

[54] MULCH LOOSENING RAKE

[76] Inventor: Lawrence L. Duckworth, 7510 Maple La., Raytown, MO 64138

[21] Appl. No.: 88,769

[22] Filed: Oct. 29, 1979

[51] Int. Cl.³ ............................................. A01B 31/00
[52] U.S. Cl. ...................................... 172/621; 56/400; 172/643
[58] Field of Search ........................ 56/16.1, 395, 400; 172/619, 620, 621, 622, 643, 710

[56] References Cited
U.S. PATENT DOCUMENTS

| | | | |
|---|---|---|---|
| 711,956 | 10/1902 | Furthmiller | 172/621 |
| 835,879 | 11/1906 | Bowman | 172/622 |
| 2,333,586 | 11/1943 | Rude | 172/622 |
| 3,123,154 | 3/1964 | Boyle | 172/643 |
| 3,765,159 | 10/1973 | Neff | 56/400 |

Primary Examiner—Paul J. Hirsch
Attorney, Agent, or Firm—John A. Hamilton

[57] ABSTRACT

A mulch loosening rake consisting of a frame carrying a multiplicity of downwardly projecting spring teeth dragging the ground, said teeth being biased forwardly and downwardly but sprung rearwardly by forward motion of the frame, each tooth having a stop member intermediate its ends engageable with the frame after partial springing thereof to reduce its effective length to the portion between the stop and its free end, so as to increase its effective stiffness, and being so supported as to provide a pronounced downward movement thereof if allowed by ground contour to recover forwardly, so as to be enabled to follow the ground contour accurately.

5 Claims, 4 Drawing Figures

MULCH LOOSENING RAKE

This invention relates to new and useful improvements in lawn rakes, and has particular reference to a rake especially suited for loosening any mulch layer which has been allowed to accumulate on a lawn.

The mulching of a lawn, by allowing a layer of old grass cuttings, crumbled leaves or the like to accumulate, or by applying a compost thereto, is of course generally beneficial to the lawn, and is often used to reduce surface evaporation of moisture, reduce erosion of the soil, assist in controlling weed growth, and by its decomposition to enrich the soil. However, if allowed to accumulate to too great an extent, it can also reduce and stifle the growth of grass, since it tends to form a mat, often quite dense, directly against the ground at the base of the grass, which new grass growth cannot easily penetrate. Hence it is desirable to loosen said mulch, and usually also to remove all or a portion of it, periodically whenever it accumulates to an excessive thickness. The provision of a lawn rake especially adapted for the mulch loosening function is the overall object of the present invention. The present rake does not collect the mulch in piles for removal, in the manner of a conventional rake, but loosens it and raises it, leaving most of it supported at the upper ends of the blades of grass, so that its lawn "stifling" effect is alleviated, and where it may, if desired, be collected and removed by conventional rakes, lawn vacuum cleaners, or the like.

The loosening of lawn mulch presents certain problems. Since as previously mentioned the mulch tends to collect in a more or less dense "mat" directly against the ground at the base of the grass, any rake capable of loosening it must have very slender teeth in order to penetrate and avoid being deflected to ride over the grass itself, and to penetrate the mulch mat to ride directly against the ground in order to effectively loosen the mat of mulch. The downward pressure of the tooth should be maintained despite minor variations in the ground level. Accordingly, a more specific object of the present invention is the provision of a rake consisting of a frame adapted to be pulled forwardly by a lwan and garden tractor or other suitable vehicle and carrying a large number of very slender, downwardly projecting spring teeth which drag over the ground as the frame is pulled. Each tooth is flexed upwardly by the weight of the frame, but can recover downwardly by its own resilience whenever its point traverses any slight depression in the ground level, in order to maintain intimate contact with the ground.

The downward force exerted on the teeth by the frame must be substantial in order to insure penetration of the mulch and intimate ground contact by the teeth. This necessitates a rather heavy frame, and since the teeth are very slender and resilient, this in turn necessitates that the teeth have a rather short effective length. If they were substantially longer, the added yieldability thereof would render them incapable of supporting the weight of the frame, and the frame would ride on the ground. On the other hand, when some of the teeth traverse a depression in the ground level, they can spring downwardly to follow the level only to a slight degree, and hence would be capable of following only slight variations of ground contour. A longer flexible tooth would have a greater downward recovery when traversing a depression, and hence could follow deeper and more pronounced variations of ground contour.

Accordingly, another object of the present invention is the provision of a rake of the character described in which the teeth are much longer than would normally be required for use on smooth terrain, but in which each tooth carries a stop member intermediate its ends which abuts against the frame as the tooth is flexed upwardly by the weight of the frame whereby to reduce the effective length of the tooth to that portion thereof between the stop and its free end. This provides the requisite stiffness for normal operation on smooth ground. But when the tooth traverses a ground depression and recovers downwardly, the stop leaves the frame and the entire length of the tooth comes into play, multiplying the downward recovery of the tooth and permitting it to follow deeper depressions in the ground level.

A further object is the provision of the rake of the character described wherein the teeth are mounted in the frame by means operable, whenever the teeth tend to recover downwardly when traversing a depression, to accentuate and multiply the downward component of said movement, thereby permitting the rake to follow still deeper and more abrupt variations of ground level.

Other objects are simplicity and economy of construction, and efficiency and dependability of operation.

Figure 2:
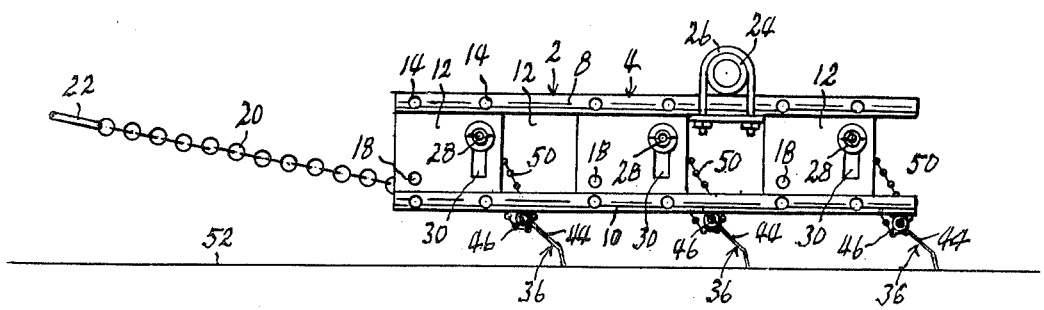
Figure 3:
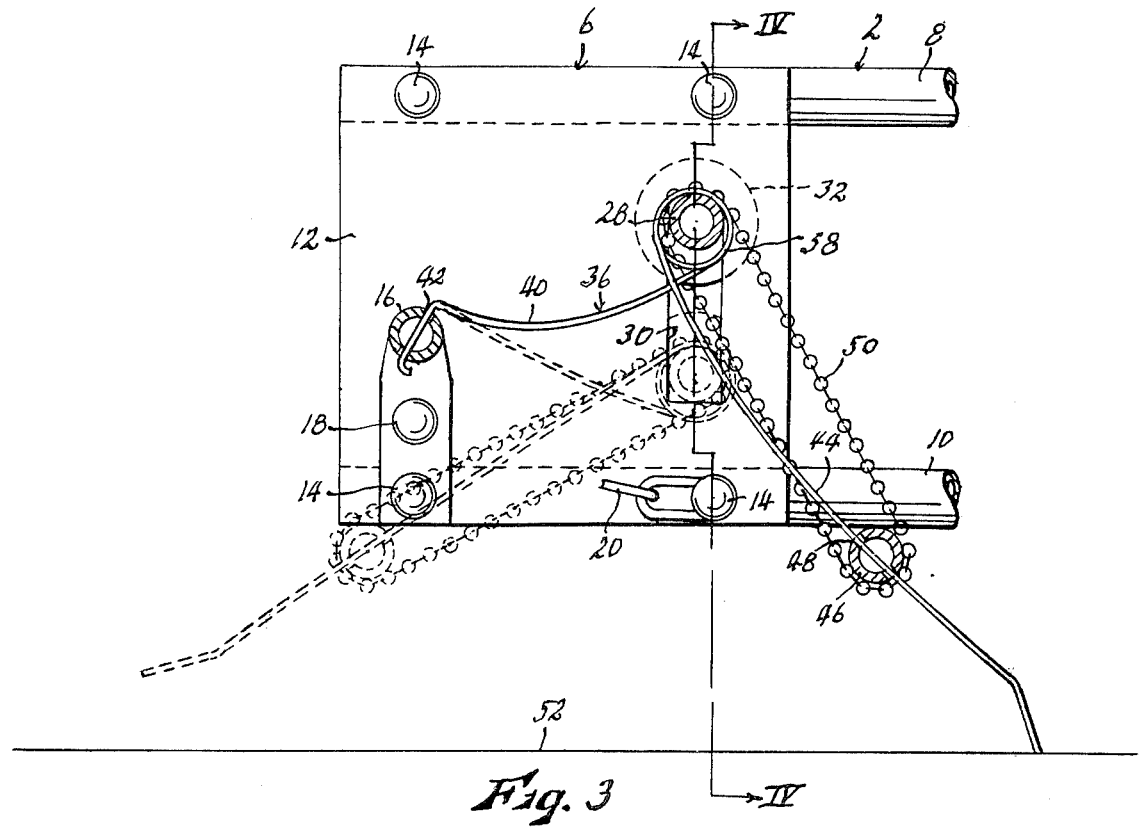
Figure 4:
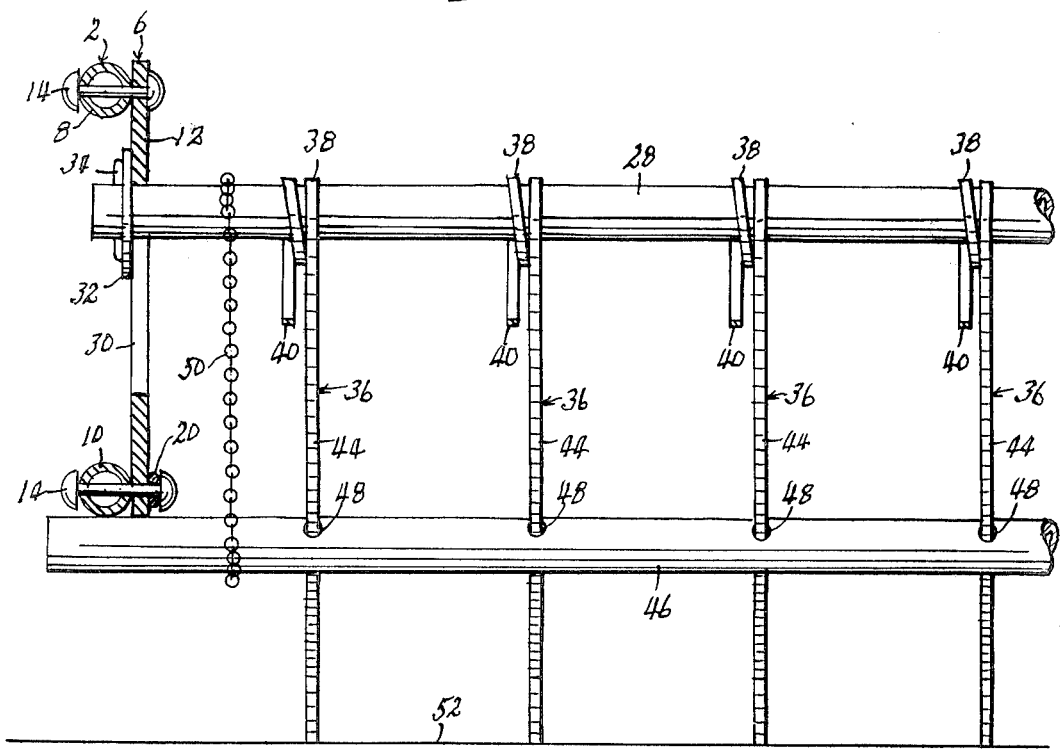

With these objects in view, as well as other objects which will appear in the course of the specification, reference will be had to the accompanying drawing, wherein:

FIG. 1 is a top plan view of a mulch loosening rake embodying the present invention, shown in operative position, FIG. 2 is a side elevational view of the rake as shown in FIG. 1, FIG. 3 is an enlarged, fragmentary sectional view taken on line III—III of FIG. 1, and indicating the rest position of the teeth in dotted lines, and FIG. 4 is a fragmentary sectional view taken on line IV—IV of FIG. 3, with parts left in elevation.

Like reference numerals apply to similar parts throughout the several views, and the numeral 2 applies generally to the frame of a rake embodying the present invention. Said frame includes a pair of vertical side walls 4 and 6 each comprising upper and lower parallel tubular bars 8 and 10 extending from front to rear and rigidly connected by a plurality of vertical plates 12 (three shown) which are regularly spaced apart from front to rear of the frame, and which are affixed at their upper and lower edges respectively to bars 8 and 10 by rivets 14. The frame also includes a series (three shown) of horizontal tooth mounting bars 16 extending laterally between side walls 4 and 6, each connecting a corresponding pair of plates 12 adjacent the forward edges of said plates. As shown, the end portions of each bar 16, which is tubular, are flattened, turned downwardly, and affixed to the associated plates 12 by rivets 18 and certain of rivets 14. The frame is thereby rendered unitary and rigid. A chain 20 is secured to each of the forwardmost plates 12 of side walls 4 and 6, as by one of rivets 14. Said chains converge forwardly for connection to a ring 22, which may be connected to a lawn and garden tractor to draw frame 12 forwardly, which is an upward direction as viewed in FIG. 1. As will appear, frame 2 must be of substantial weight, and while it is of economical, lightweight construction as thus far described, its weight may be increased as required in any suitable manner, for example by laying heavy sections of pipe or rod 24 (one shown) laterally across the top of frame 2, and affixing them as by U-bolts 26 to the upper bars 8 of the frame side walls.

Spaced rearwardly from each frame bar 16, and parallel therewith though extending between the same pair of side wall plates 12 to which its associated bar 16 is affixed, there is disposed a tooth carrier bar 28. Bar 28 is of sufficient length to pass at each end through a vertically elongated slot 30 formed in the associated plate 12, and is laterally slidable, in a vertical direction, within said slots. A washer 32 (see FIGS. 3 and 4) encircling said bar at the exterior surface of each plate 12, and secured by a cotter pin 34, maintains the bar in assembly with the frame.

Each carrier bar 28 carries a series of rake teeth 36 in regularly spaced relation therealong. Each of said teeth comprises a single elongated length of very slender spring steel, a central portion thereof being coiled helically but loosely around bar 28, the coil 38 being of somewhat larger internal diameter than bar 28, and two end portions projecting outwardly from said coil. One of these end portions constitutes a spring arm 40 which extends generally forwardly and is effectively affixed at its forward end to the associated bar 16, as by being inserted through a hole formed therefor transversely in said bar, as indicated at 42, and bent to secure it in place. The other end portion of the coil constitutes a spring arm 44 which extends generally downwardly, and which is of sufficient length to extend well below the bottom plane of frame 2, even if carrier bar 28 is disposed at the upper ends of its slots 30, and even if it is also inclined sharply forwardly or rearwardly from bar 28.

A stop bar 46 is associated with each carrier bar 28, the stop bar extending horizontally beneath the frame in parallel relation to the carrier bar, and being of sufficient length to underlie the lower bars 10 of the frame side walls 4 and 6. The stop bar is transversely drilled at intervals along its length corresponding to the spacing between spring arms 44 of the teeth carried by its associated carrier bar, whereby to form holes 48 through which said spring arms extend in slidable relation thereto. The stop bar is disposed in spaced relation from the free lower ends of spring arms 44, the projecting portions of said arms constituting the effective operating portions of the rake teeth. The stop bar is maintained at a minimum spacing from the free lower ends of the teeth, and at a maximum spacing from the associated carrier bar, by chain loops 50 engaged about each carrier bar and its associated stop bar, adjacent each of the ends thereof adjacent side walls 4 and 6. Otherwise, the stop bar is free to move slidably along the teeth which pierce it. The elongated spring elements forming the teeth are pretensioned to bias carrier bars 28 downwardly in slots 30 at all times, and to bias arms 44 thereof forwardly and upwardly to press stop bars 46 upwardly against the lower edges of side walls 4 and 6, as shown in dotted lines in FIG. 3.

In operation, though the teeth normally assume the dotted line position shown in FIG. 3 when the rake is at rest, it will be seen that when the frame is drawn forwardly by chains 20, the teeth will be pivoted rearwardly, first arcing downwardly, and then upwardly, by the fact that the points of the teeth either dig into the ground surface 52, or drag therealong with substantial resistance to forward movement, to the position shown in solid lines, wherein stop bar 46 again abuts the lower edges of the frame side walls, but at a position substantially rearwardly from their original positions, and each rearwardly from its associated carrier bar 28. During this pivotal movement, and as the points of the teeth pass under their carrier bar 28, the weight of frame 2 presses slots 30 of plates 12 downwardly over the carrier bar until it is disposed in the upper ends of said slots, as shown in solid lines in FIG. 3, thereby flexing and applying additional tension to spring arms 40. The weight of the frame should be adequate for this purpose. During the remainder of the movement, until stop bar 46 again engages the frame, spring arms 44 are flexed upwardly and rearwardly, until bar 46 engages the frame. The parts then have the positions shown in solid lines in FIG. 3, and as the device is drawn forwardly by chains 20, the teeth will perform their intended function of loosening the mulch. Actually, unless the mulch is very heavy, the rake will not push the mulch ahead of the teeth in piles, due to the slenderness and wide spacing of the teeth. Instead, the mulch will be loosened, separated from the ground at the base of the grass, lifted through the grass, and then pass between the teeth, to be left lying for the most part at the tops of the grass blades. This may be all that is desired, since the loosening and lifting of the mulch permits the soil to "breathe", relieving it of the possibly stifling and grass-growth inhibiting effect of the mulch. However, if complete removal of the mulch is desired, the loosening and lifting performed by the present rake renders the mulch capable of being gathered for disposal by more conventional rakes, or by lawn vacuum cleaners or the like. Such devices are largely ineffective in gathering mulch which has become matted on the ground at the base of the grass.

With the parts in the solid line position of FIG. 3, the effective length of the teeth constitutes only those portions thereof between stop bar 46 and their free lower ends, rather than their full lengths from mounting bars 16 to their free ends. This shortened effective length, as provided by the stop bars, in effect stiffens the free end portions of the teeth, permitting frame 2 to be heavier than it could be if the stop bars were not used and the teeth were free to yield along their entire lengths, and hence permits a downward pressure on the teeth sufficient to insure that they will always penetrate the mulch to drag directly on the ground beneath the mulch. Nevertheless, yieldability of the teeth along their entire lengths is useful for another purpose, as will be described.

When in the solid line FIG. 3 position, the weight of frame 2 of course also flexes the portions of the teeth below bar 46, as shown. Therefore, if any tooth traverses a slight declevity in the ground surface, while other teeth remain supported on higher ground, that tooth will recover resiliently, moving its tip in a downward and forward direction to follow the declevity. However, since the free end portions of the teeth are short, and the downward movement of the tooth tips by this recovery is therefore small, this provision in itself provides that the teeth will follow the ground surface accurately only on surfaces having only slight irregularities, while actual lawns often have much greater irregularities of contour. With the present rake, if one set of teeth, that is those mounted on one carrier bar 16, traverse a declivity sufficiently deep that resilient recovery of their free end portions does not extend their tips to engage the ground within the declevity, then spring arms 44 of the teeth begin to straighten by their own resilience, moving stop bar 46 downwardly and forwardly out of contact with the frame. This recovery of the entire lengths of arms 44, rather than merely the free end portions thereof, greatly increases the vertically downward movement of the tooth tips provided by the recovery, and hence permits the tooth tips to follow accurately the ground contour in much deeper surface declivities. The available vertical movement of the tooth tips is further multiplied by the arrangement of carrier bars 28. When spring arms 44 recover resiliently and therefore tend to relax, spring arms 40 also tend to recover resiliently, and hence force carrier bar 28 downwardly in frame slots 30, by reason of the engagement of coils 38 about said carrier bar. The movement of the carrier bar is constrained to vertical by its guidance in slots 30. Any binding of the bar in the slots is prevented by the fact that coil 38 is of slightly larger diameter than the bar. Thus the downward movement of the tooth tips when spring arms 44 spring forwardly to lower stop bar 46 from the frame is multiplied not only by the fact that the full length of said arm then comes into play, as previously described but also by the fact that the entire spring arm 44 is also lowered bodily by the downward movement of bar 28 in slots 30. Hence the teeth of one set can accurately follow the ground contour of quite deep declevities, even when the teeth of other sets are supported at higher levels. Stop bars 46 are preferably mounted loosely on spring arms 44, as shown, in order not to impede or interfere with full length flexing of said arms, and to permit some degree of independent movement of even directly adjacent teeth. This loose mounting necessitates the use of chain loops 50 to preserve the proper positioning of the bar on the spring arms.

While I have shown and described a specific embodiment of my invention, it will be readily apparent that many minor changes of structure and operation could be made without departing from the spirit of the invention.

What I claim as new and desire to protect by Letters Patent is:

1. A mulch loosening rake comprising:
   a. a frame having a substantial horizontal area and adapted to be drawn over the ground,
   b. a large number of slender elongated resilient teeth distributed over the area of said frame,
   c. mounting means securing the upper ends of said teeth in said frame, said teeth extending below the lower plane of said frame to engage the ground at their lower ends to support said frame above ground level, the weight of said frame being sufficiently great that when said frame is moved forwardly, the resistance to forward travel of the lower ends of said teeth over the ground will cause said teeth to be flexed upwardly and rearwardly relative to the points of attachment of their upper ends in said frame, each of said teeth having a substantial portion of its length disposed between its point of attachment in said frame and the lower plane of said frame, and
   d. a stop member carried by each of said teeth intermediate its ends and operable to be moved upwardly into abutting relation with said frame by said upward and rearward flexing of said tooth, whereby the effective length of said tooth is then limited to that portion thereof between said stop member and the free lower end thereof.

2. A rake as recited in claim 1 wherein said mounting means additionally includes:
   a. a carrier member mounted in said frame for limited vertical movement relative thereto generally above each of said teeth, a point of each of said teeth intermediate its ends being connected to the carrier member associated therewith, and
   b. the portion of each tooth intermediate its upper end and said carrier member forming an upper spring arm biasing said carrier member downwardly relative to said frame, said carrier member being moved upwardly relative to said frame, against the pressure of said spring arm, by the weight of said frame during said upward and rearward flexing of said teeth.

3. A rake as recited in claim 1 wherein said teeth are arranged in rows extending laterally of said frame, and wherein said mounting means for each of said rows of teeth includes a mounting bar extending laterally of said frame and fixed therein, the upper end of each of the teeth of said row being affixed to said mounting bar, and wherein said stop member for the teeth of each of said rows constitues a stop bar extending laterally of said frame therebeneath and engaging all of the teeth of said row of teeth at points intermediate their ends, said stop bar being movable into upwardly abutting relation to said frame by said upward and rearward flexing of said teeth, whereby to limit the effective lengths of said teeth.

4. A rake as recited in claim 3 wherein said mounting means for each of said rows of teeth additionally includes a carrier bar extending laterally of said frame rearwardly of the associated mounting bar, and mounted in said frame for limited vertical movement relative thereto, each of the teeth of said row comprising a single length of spring steel having an intermediate portion thereof coiled loosely about said carrier bar, the end portion thereof intermediate said mounting bar and said carrier bar forming a spring arm tensioned to bias said carrier bar downwardly relative to said frame, and the other end portion thereof extending downwardly below said frame and having said stop bar engaged thereon intermediate its ends.

5. A rake as recited in claim 4 wherein said stop bar is loosely engaged on the downwardly extending end portions of said teeth for free sliding movement therealong, and with the addition of a plurality of chain loops encircling said carrier and stop bars, whereby to maintain a proper spacing therebetween.

* * * * *